United States Patent [19]

Oberg

[11] Patent Number: 4,717,472
[45] Date of Patent: * Jan. 5, 1988

[54] OIL FILTER ASSEMBLY HAVING MULTIPLE REMOVABLE FILTER MEMBERS AND COOLING FINS

[75] Inventor: Gordon D. Oberg, Lynwood, Wash.

[73] Assignee: Oberg Enterprises, Inc., Everett, Wash.

[*] Notice: The portion of the term of this patent subsequent to May 1, 2001 has been disclaimed.

[21] Appl. No.: 819,006

[22] Filed: Jan. 14, 1986

Related U.S. Application Data

[63] Continuation of Ser. No. 600,772, Apr. 16, 1984, abandoned, which is a continuation-in-part of Ser. No. 387,151, Jun. 10, 1982, Pat. No. 4,446,017.

[51] Int. Cl.$^4$ .............................................. B01D 27/10
[52] U.S. Cl. ................................. 210/90; 210/132; 210/134; 210/168; 210/186; 210/247; 210/339; 210/445
[58] Field of Search ............... 210/90, 130, 132, 133, 210/134, 186, 247, 335, 339, 420, 422, 455, 456, 168, 336, 445

[56] References Cited

U.S. PATENT DOCUMENTS

| | | | |
|---|---|---|---|
| 915,650 | 3/1909 | Anderson | 210/335 X |
| 1,488,671 | 4/1924 | Hale | 210/445 |
| 1,966,274 | 7/1934 | Wells | 210/336 X |
| 2,463,800 | 3/1949 | Pate | 210/186 |
| 2,468,866 | 5/1949 | Collier | 210/186 |
| 2,809,754 | 10/1957 | Pudlo | 210/443 |
| 2,862,623 | 12/1958 | Werner | 210/445 |
| 2,895,613 | 7/1959 | Griffiths | 210/445 X |
| 3,560,377 | 2/1971 | Loeffler | 210/450 X |
| 3,567,028 | 3/1971 | Nose | 210/232 |
| 4,246,109 | 1/1981 | Manders | 210/90 |
| 4,446,017 | 5/1984 | Oberg | 210/90 |

FOREIGN PATENT DOCUMENTS

| | | |
|---|---|---|
| 3202330 | 9/1982 | Fed. Rep. of Germany . |
| 2191442 | 1/1974 | France . |
| 2218129 | 9/1974 | France . |
| 558669 | 2/1975 | Switzerland . |

Primary Examiner—David Sadowski
Attorney, Agent, or Firm—Laubscher & Laubscher

[57] ABSTRACT

A multi stage oil filter assembly is disclosed characterized by a housing including base and cover members and at least one intermediate member arranged between the base and cover members. A first planar filter member is arranged between the cover and intermediate members and a second planar filter member is arranged between the intermediate and base members. The planar faces of the base and cover members adjacent the intermediate member each contain a plurality of concentrically spaced circular grooves and a radial conduit affording communication between the grooves, whereby fluid is distributed across the planar faces of the base and cover members adjacent the planar filter members. The intermediate member contains a plurality of segmented circular concentrically spaced slots corresponding with the grooves of the base and cover member planar faces. The housing includes inlet and outlet openings, whereby when fluid enters the housing, it is distributed across the planar face of one of the base and cover members, passes through the first filter member, the slots of the intermediate member, and through the second filter member and exits the housing through the other of the base and cover members. The housing includes a plurality of cooling fins on its outer surface to cool the fluid as it passes through the filter assembly.

7 Claims, 9 Drawing Figures

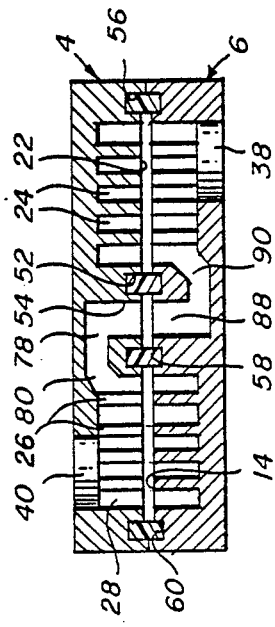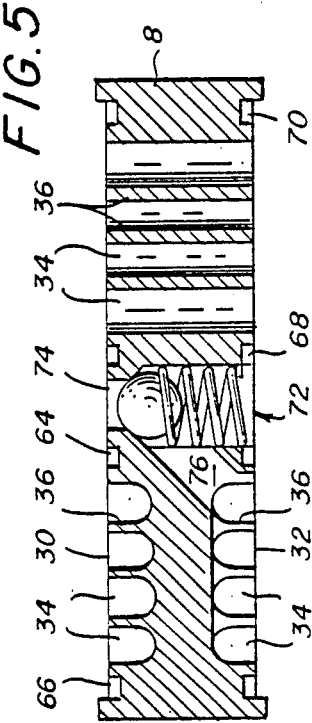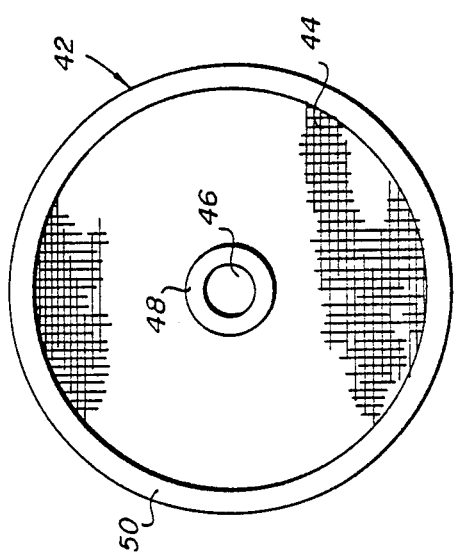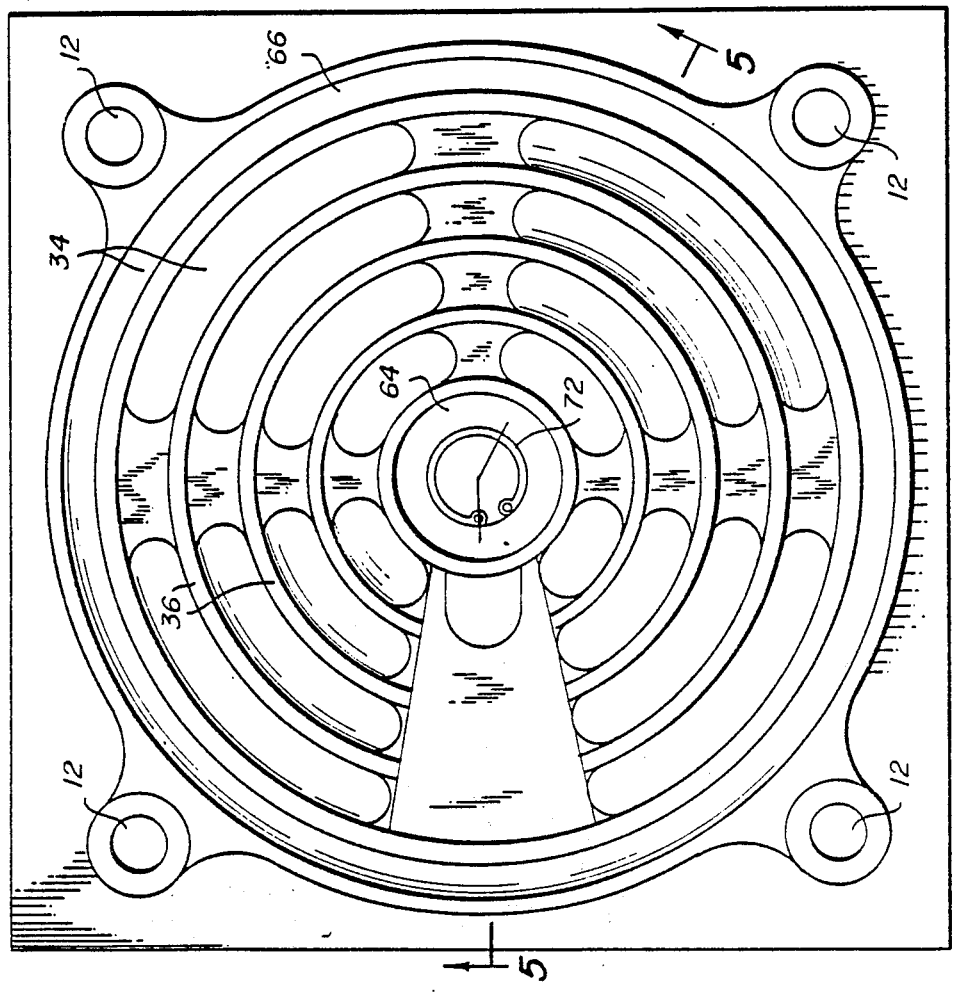

OIL FILTER ASSEMBLY HAVING MULTIPLE REMOVABLE FILTER MEMBERS AND COOLING FINS

This application is a continuation of application Ser. No. 600,772 filed Apr. 16, 1984, now abandoned, which was a continuation-in-part of application Ser. No. 387,151 filed June 10, 1982, now issued as U.S. Pat. No. 4,446,017.

BACKGROUND OF THE INVENTION

The present invention relates to an improved multi-stage oil filter assembly for filtering virtually all of the oil delivered to a combustion engine. The assembly is permanently mounted adjacent the engine and contains a plurality of re-usable planar filter members which are easily removed from the assembly for inspection and cleaning. Cooling fins are provided to cool the oil before it is recirculated to the engine.

BRIEF DESCRIPTION OF THE PRIOR ART

Multi-stage filtering assemblies are well known in the patented prior art as evidenced by the patent to Loeffler U.S. Pat. No. 3,560,377. While the prior devices normally operate quite satisfactorily, they do possess certain inherent drawbacks which make them unsuitable for filtering fluids of high thickness or density such as oil. This is due to the fact that the fluid flow paths of the prior devices do not efficiently transport the fluid to be filtered through the filter media at a rate sufficient to still provide adequate lubrication to an engine. Moreover, no suitable bypass is provided for the fluid in the event one of the filter stages becomes clogged with filtered media.

The present invention was developed in order to overcome these and other drawbacks of the prior devices by providing a permanent oil filter assembly which efficiently and reliably filters oil to an engine. The assembly is designed to distribute oil to be filtered over the entire surface area of a plurality of planar filter members, whereby the oil will be filtered uniformly. Furthermore, the filter member may be readily removed from the assembly for inspection, cleaning and re-use.

SUMMARY OF THE INVENTION

Accordingly, it is a primary object of the present invention to provide an oil filter assembly including a sectional housing including first and second cover members having planar faces containing a plurality of corresponding, circular, concentrically spaced grooves which define a plurality of concentrically spaced circular ribs, respectively. The planar faces of each of the first and second cover members also contain a radial groove extending through each of the associated ribs, respectively, thereby to define a passage affording communication between the associated grooves. The housing contains inlet and outlet openings communicationg with the radial grooves respectively. At least one intermediate member is arranged between the first and second cover members. The intermediate member has planar faces adjacent the planar faces of the first and second cover members and contains a plurality of segmented, circular, concentrically spaced slots corresponding with the circular grooves contained in the planar faces of the first and second cover members. A first planar filter is arranged between the planar faces of the first cover member and the intermediate member and extends between the circular grooves and slots contained therein, respectively. A second planar filter is arranged between the planar faces of the second cover member and the intermediate member and extends between the circular grooves and slots contained therein, respectively. The first cover, intermediate, and second cover members are connected together so then when fluid is delivered to the inlet opening, it is distributed across the face of the first cover member via the radial and circular grooves thereof, passes through the first filter member, the slots of the intermediate member, and the second filter member, and is discharged from the housing via the circular and radial grooves of the second cover member and via the outlet opening.

According to a more specific object of the invention, the intermediate member contains a pressure relief fluid bypass for bypassing the filter portion of the first filter member in the event that the first filter member becomes clogged with filtered particulates.

According to yet another object of the invention, the filter assembly housing includes a plurality of cooling fins on the outer surface thereof for cooling the fluid being filtered as it passes through the housing.

BRIEF DESCRIPTION OF THE DRAWING

Other objects and advantages of the subject invention will become apparent from a study of the following specification when viewed in the light of the accompanying drawing, in which:

FIG. 4 is a front plan view of a planar face of the intermediate member;

FIG. 5 is a vertical sectional view of the intermediate member taken along line 5—5 of FIG. 4;

FIG. 6 is a plan view of a filter member;

FIG. 9 is a sectional view of the oil filter assembly of FIG. 1 with the cooling fins omitted.

DETAILED DESCRIPTION

Figure 1:
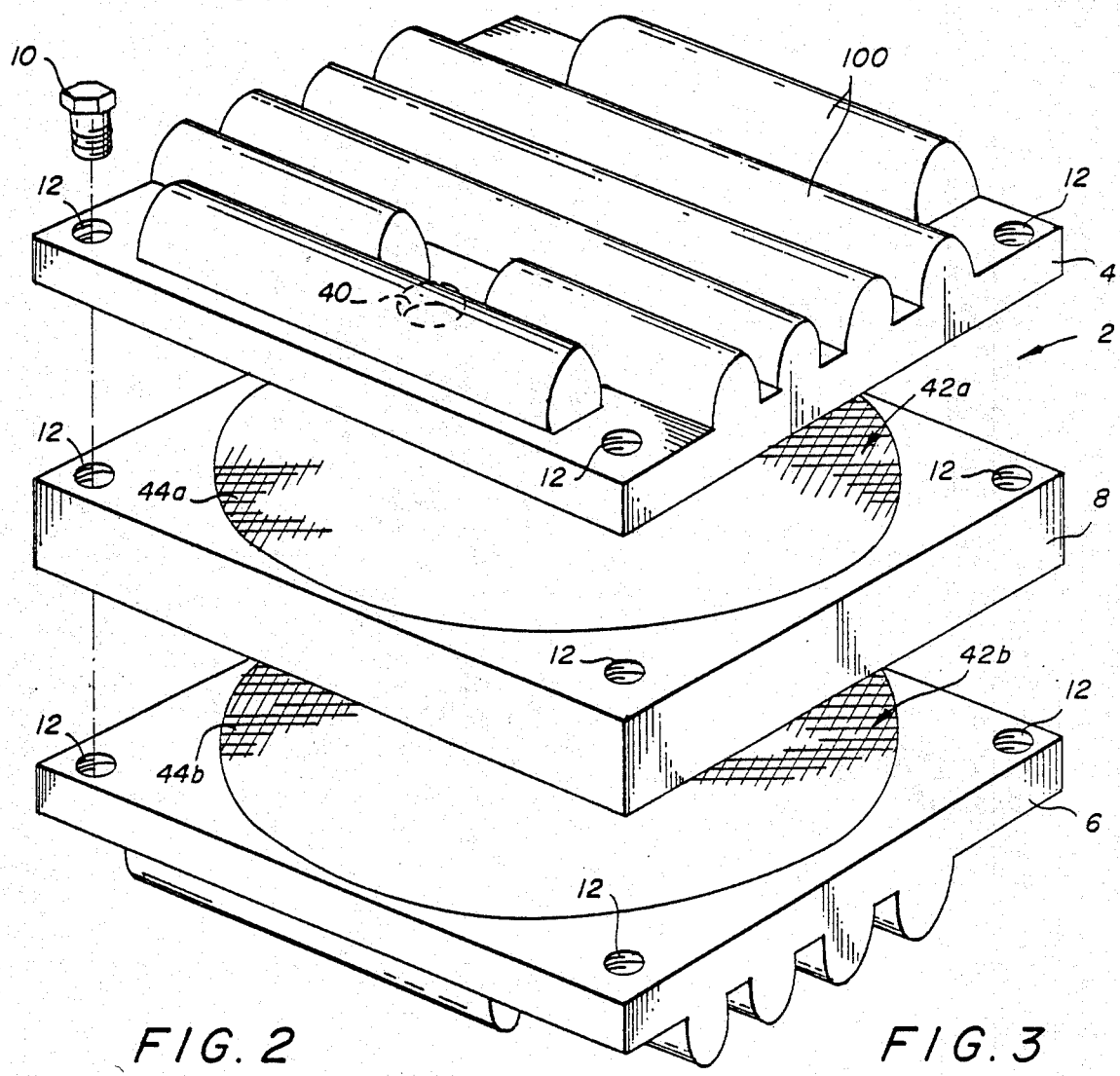
FIG. 1 is an exploded perspective view of the oil filter assembly according to the invention.

Referring first to FIG. 1, the multi-stage oil filter assembly according to the present invention comprises a sectional housing 2 including a first cover member 4 and a second cover or base member 6 between which is arranged an intermediate member 8. The assembly is connected together by any suitable means such as bolts 10 which pass through aligned threaded openings 12 in the members.

Figure 2:
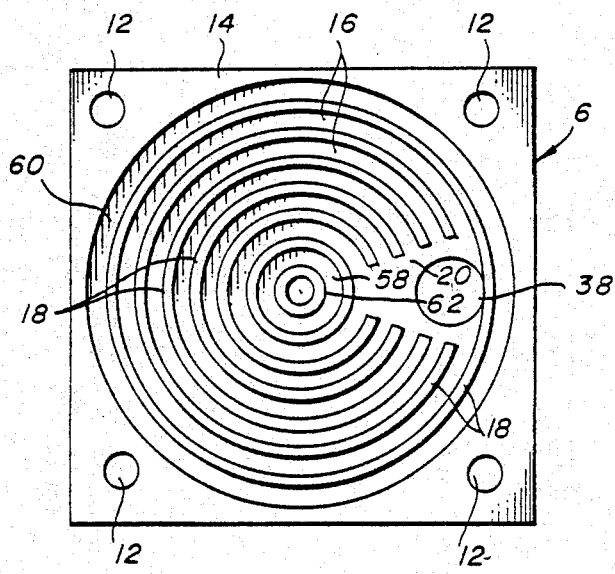
FIG. 2 is a front plan view of the planar face of one of the housing members.

As shown in FIG. 2, the base member 6 has a planar face 14 which contains a plurality of circular, concentrically spaced grooves 16 which define a plurality of concentrically spaced circular ribs 18. A radial groove 20 contained in the planar face 14 of the base member extends through each of the ribs to define a passage for communication between the grooves.

Figure 7:
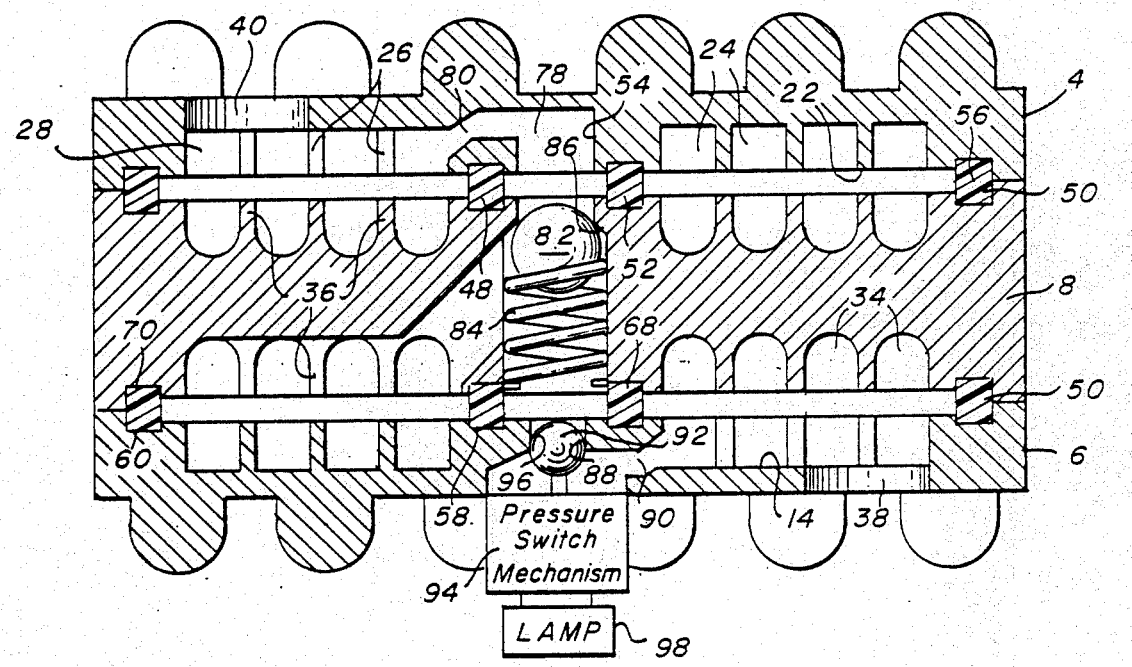
FIG. 7 is a vertical sectional view of the connected oil filter assembly of FIG. 1.

As shown in the sectional view of FIG. 7, the cover member 4 also has a planar face 22 containing a plurality of circular, concentrically spaced grooves 24 which define a plurality of concentrically spaced circular ribs 26. A radial groove 28 is also provided in the face of the cover member and extends through each of the ribs to define a passage for communication between the grooves thereof.

The intermediate member 8 is shown in detail in FIGS. 4 and 5. This member has a pair of planar faces 30, 32 on opposite surfaces thereof and contains a plurality of segmented, circular, concentrically spaced slots 34 extending vertically therethrough. The slots define a plurality of concentrically spaced circular ribs 36 arranged therebetween.

As shown in FIG. 7, when the oil filter assembly is assembled and connected together, the cover planar face 22 is arranged adjacent the upper planar face 30 of the intermediate member and the base planar face 14 is arranged adjacent the lower planar face 32 of the intermediate member. Furthermore, the ribs 26 and circular grooves 24 of the cover member 4 are arranged opposite and correspond to the ribs 36 and grooves 34 of the intermediate member which in turn are arranged opposite and correspond to the ribs 18 and grooves 16 of the base member.

Figure 3:
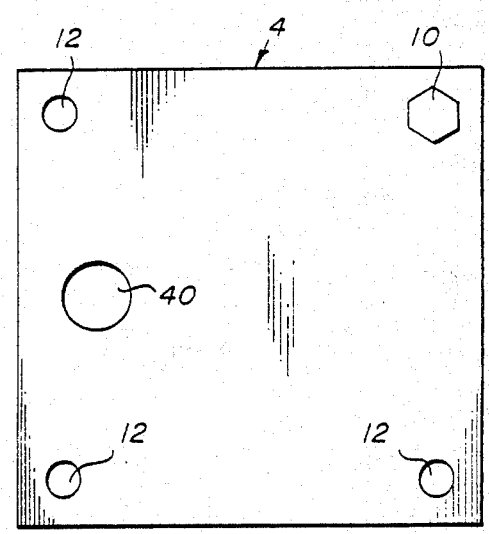
FIG. 3 is a front plan view of a housing cover member without cooling fins.

As shown in FIGS. 2 and 7, the base member 6 contains an outlet opening 38 which communicates with the base member radial groove 20. Similarly, as shown in FIGS. 1, 3, and 7, the cover member 4 contains an inlet opening 40 which communicates with the cover member radial groove 28. When the housing is assembled as shown in FIG. 7, the inlet 40 and outlet 38 openings are arranged diametrically opposite one another as are the base and cover member radial grooves 20, 28.

A filter member 42 for use in the oil filter assembly is shown in FIG. 6. The filter member comprises a mesh 44 such as a wire screen having openings on the order of 200 microns. In its preferred from, the filter member has a planar, circular configuration and contains a central opening 46. A first sealing device 48 is arranged around the inner diameter of the filter member adjacent the central opening and a second sealing device 50 is arranged around the circumference of the filter member. In a preferred embodiment, the sealing devices comprise O-rings formed of a synthetic plastic or rubber material.

A first filter member 42a is arranged between the adjacent planar faces of the cover 4 and intermediate 8 members and a second filter member 42b is arranged between the adjacent planar faces of the intermediate 8 and base 6 members as shown in FIGS. 1 and 7. In FIG. 7, the mesh portion of the filter member has been omitted for clarity. It will be readily apparent to those skilled in the art that additional intermediate members and filter members may be provided in the assembly to increase the number of filtering stages thereof.

Referring once again to FIG. 7, the cover member 4 contains in its planar face 22 an inner seating channel 52 arranged within and spaced from the associated innermost circular groove to define a central portion 54. The cover member planar face further includes an outer seating channel 56 arranged outside of and spaced from the outermost groove. In a like manner, the base member planar face 14 contains inner 58 and outer 60 seating channels with the inner seating channel defining a central portion 62. The upper planar face 30 of the intermediate member 8 contains inner 64 and outer 66 seating channels corresponding with the inner 52 and outer 56 channels of the cover member planar face. Similarly, the lower planar face 32 of the intermediate member 8 contains inner 68 and outer 70 seating channels corresponding with the inner 58 and outer 60 seating channels of the base member planar face 14. The inner channels 64, 68 of the intermediate member 8 define a central portion 72 thereof. As shown in FIG. 7, the corresponding inner and outer seating channels of the base, intermediate, and cover members are adapted to receive the first and second O-rings, respectively, of the first and second filter members.

In order to assemble the device, the first filter member 42a is arranged between the cover 4 and intermediate 8 members and the second filter member 42b is arranged between the intermediate 8 and base 6 members with the respective O-rings arranged in the corresponding seating channels as shown in FIG. 7. The cover, intermediate, and base members are then connected by tightening the bolts 10 which pass through the aligned openings 12 contained therein.

The oil filter assembly is adapted for use in connection with any type of engine. The assembly is permanently mounted adjacent the device by a suitable mounting assembly (now shown). Oil to be filtered is delivered from the oil pump of the engine through a line to the input opening 40 which is preferably threaded for connection with the line from the oil pump. The oil passes through the radial groove 28 of the cover member into the circular grooves 24 of the cover member for distribution across the planar face thereof. The oil then passes through the mesh 44a of the first filter member whereby minute particulates and contaminants are removed from the oil. The filtered oil flows through the slots 34 of the intermediate member and passes through the mesh 44b of the second filter member where additional particulates are removed from the oil. The twice filtered oil then flows into the circular grooves 16 of the base member for passage to the outlet opening 38 via the radial passage 20 thereof. The filtered oil is dischaged from the oil filter assembly via the outlet opening and transported through a line (not shown) to the engine. The outlet opening may be threaded for connection with the line to the engine.

The oil filter assembly is capable of filtering up to 20 gallons of oil per minute at oil pressure up to 200 psi. Because of the unique arrangement of grooves within the planar faces of the base and cover members and the slots in the intermediate member, the oil is distributed over the entire surface area of the filter members for more efficient filtering and increased fluid flow. Accordingly, the assembly is particularly suitable for high performance engines and other applications where cleanliness of the lubricating oil is important.

After use for a significant period of time, particulates from the filtered oil will accumulate on the filter meshes, thereby restricting the flow of oil through the meshes. It will be appreciated that the filter members may be removed from the assembly for cleaning and inspection merely by removing the fastening bolts and separating the cover, intermediate, and base members to expose the filter members. At this point, the filters may be visually inspected to determine the degree of wear on the engine. Following removal of the filters, the meshes are cleaned with a suitable solvent such as gasoline and the filters are replaced in the seating channels. The assembly is then re-assembled and connected with the bolts. Owing to the relatively low internal volume of the housing, only about one-half cup of oil is lost during removal of the filters. Accordingly, the oil need not be drained from the engine in order to clean the filter members.

Because oil to be filtered passes through the first filter member 42a before passing through the second filter member 42b, the first filter member will ordinarily accumulate particulates at a faster rate and become clogged prior to the second filter member. Should the first filter member become clogged, the oil pressure will rise above a safe value. Accordingly, the intermediate member includes a first pressure relief oil bypass conduit which transports oil from the cover member directly to the lower planar surface of the intermediate member and thus to the second filter member via the opening in the first filter member when the oil pressure reaches a given value.

As shown in FIG. 5, the central portion 72 of the intermediate member contains a through-aperture 74 arranged along the axis of the associated circular slots 34. The intermediate member further includes a radial conduit 76 arranged between the upper portion of the aperture and the lower portion of the slots affording fluid communication therebetween. Similarly, the central portion 54 of the cover member planar face contains an aperture 78 arranged along the axis of its associated circular grooves, and a conduit 80 is provided in the cover member 4 between the lower portion of the aperture and the radial groove 28 to afford fluid communication therebetween. The apertures and conduits combine to form the first pressure relief oil bypass conduit.

A valve assembly including a ball bearing 82 and a spring 84 for biasing the ball bearing against a bevelled edge 86 of the aperture 74 normally closes the radial first bypass conduit 76. As the oil pressure increases owing to restricted flow through the clogged mesh of the first filter member, the oil pressure reaches a given value which is greater than the biasing force of the spring against the ball bearing, whereby the ball bearing is displaced by the oil pressure against the spring to open the conduit 76 in the intermediate member, thereby to afford fluid communication to the lower portion of the slots and the second filter member.

Continued use of the assembly with the first filter member clogged and with the first bypass conduit open will eventually lead to clogging of the second filter member if the filter members are not removed and cleaned. With both filter members clogged, the oil pressure will increase to a dangerous level. Accordingly, a second pressure relief oil bypass conduit is provided in the base member to transport oil from the intermediate member through-aperture 74 to the outlet opening via the central opening of the second filter member.

More particularly, as shown in FIG. 5, the central portion 62 of the base member planar face contains an aperture 88 arranged along the axis of the associated circular grooves 16. The base member 6 further includes a radial conduit 90 arranged between the lower portion of the aperture 88 and the radial groove 20 affording fluid communication therebetween. A ball bearing 92 is arranged in the aperture 88 and in its closed position impedes fluid flow through the aperture 88 into the conduit 90. The ball bearing is normally biased to its closed position by any suitable means such as a pressure switch mechanism 94 connected with the base member. The walls which define the aperture 88 are bevelled at 96 to prevent removal of the ball bearing 92 from the aperture 88.

As particulates clog the second filter member, the oil pressure increases. When the pressure reaches a given value, which may be the value of the operating pressure of the first pressure bypass valve, the ball bearing 92 is displaced against the biasing force of the pressure switch mechanism to open the conduit 90 in the base member, thereby to afford fluid communication to the outlet radial groove 20 and the outlet opening 38.

When the ball bearing 92 is displaced against the pressure switch mechanism 94, the switch operates an indicator lamp 98 to provide a warning that the filter meshes have become clogged and should be removed for cleaning.

While the oil filter assembly has been described for use with an engine such as an automobile internal combustions engine, it will be apparent to those skilled in the art that the assembly is suitable for use in dry sump systems, or in oil cooling systems for a trans or rear end of a vehicle, or in any environment where a fluid is to be filtered.

In order to cool the oil or other fluid being filtered, the outer surfaces of the sectional housing base and cover member preferably include a plurality of parallel, integral cooling fins 100 as shown in FIGS. 1 and 7. The cooling fins are operable to dissipate heat from the oil to be filtered, the oil being heated to a relatively high temperature within the engine. In order to enhance the cooling effect, the housing is preferably formed from a high strength heat conducting material such as iron or steel. The outer surface of the housing may also be coated with a suitable material.

Figure 8:
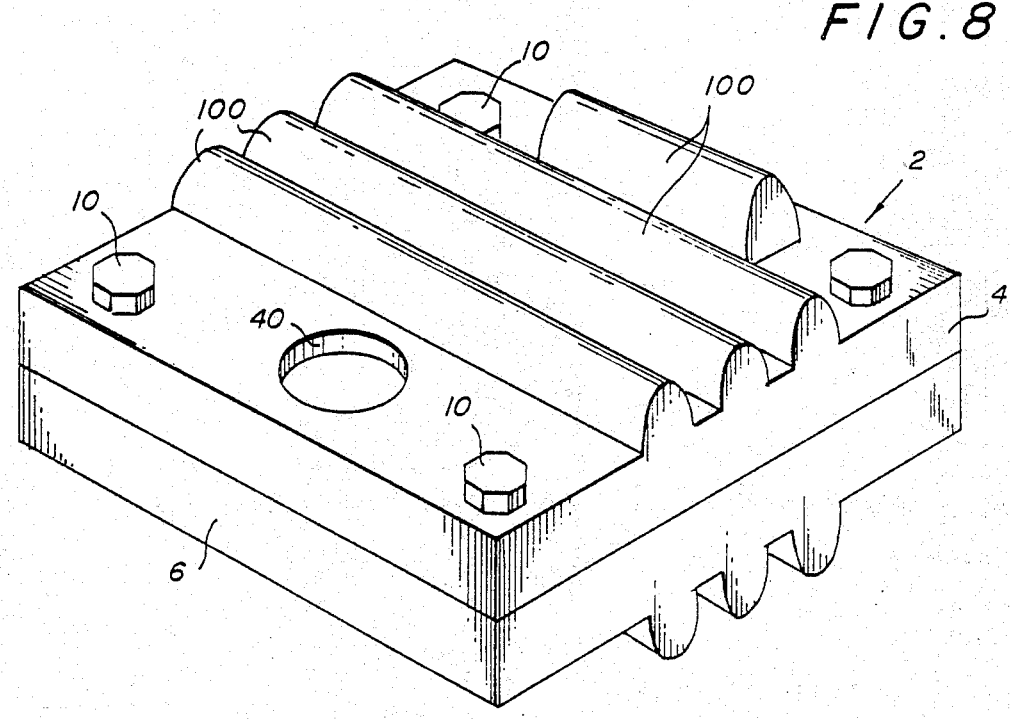
FIG. 8 is a perspective view of a single filter member oil filter assembly having cooling fins.

Cooling fins 100 may also be provided on a single stage filter as shown in FIG. 8. In such a filter, the base 6 and cover 4 members correspond with the housing members described with relation to the multi-stage filter. In the filter of FIG. 8, the intermediate member and one filter member are omitted, whereby the planar faces 14 and 22 of the base and cover members, respectively, are arranged adjacent one another as shown in FIG. 9 (where the cooling fins are omitted for clarity). The single stage filter assembly is described in greater detail in the aforementioned co-pending application Ser. No. 387,151, now U.S. Pat. No. 4,446,017.

In an alternate construction of the oil filter assembly, the inlet and outlet openings of the housing may be provided on the side of the cover and base members to afford direct linear communication with the associated radial conduits. Furthermore, the radial conduits of the assembly need not extend in diametrically radially opposite directions. Through use, it has been shown that when the initial incoming fluid such as oil to be filtered strikes the mesh of the filter member, the fluid is disbursed almost instantaneously across the planar face of the associated member via the radial conduit and concentric grooves. With the planar face of the member containing the inlet opening covered with fluid, the pressure of the subsequent incoming flow of fluid forces the fluid through the mesh. The filtered oil then follows the path of least resistance through the concentric grooves and radial conduit to the outlet opening of the other filter member.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:
1. A multistage oil filter assembly, comprising
  (a) a sectional housing containing an enclosed filter chamber and including a cover member and a base member each having an outer surface and a planar inner surface, each of said planar inner surfaces containing a plurality of circular, concentrically spaced grooves and a radial groove defining a passage affording communication between said circular grooves, respectively, said cover member containing an inlet opening communicating with said cover member radial groove and said base member containing an outlet opening communicating with said base member radial groove;
(b) intermediate member means arranged between said cover and base members to divide said filter chamber into a plurality of filter subchambers, said intermediate member means having planar surfaces arranged adjacent said cover and base member planar surfaces, respectively, a portion of said intermediate member means containing a plurality of segmented circular concentrically spaced throughslots corresponding with said cover and base member circular grooves;
(c) planar circular mesh filter means arranged in said filter subchambers, respectively, on opposite sides of said intermediate member means, said filter means extending parallel to and completely across said slotted portion of said intermediate member means, said filter means containing a central opening and including inner and outer sealing means adjacent said central opening and the circumference thereof, respectively, the planar surfaces of said cover and base members and of said intermediate member means each containing inner and outer circular seating channels for receiving said inner and outer sealing means of said filter means, respectively; and
(d) means connecting said cover member, said intermediate member means, and said base member together, whereby when oil to be filtered is supplied to said inlet opening, the oil is distributed across said cover member planar inner surface via the radial and circular grooves thereof, passes successively through said filter subchambers and said filter means arranged therein via said throughslots contained in said intermediate member means, and is discharged from said outlet opening via the circular and radial grooves contained in said base member planar inner surface.

2. Apparatus as defined in claim 1, wherein said intermediate member means contains first pressure relief oil bypass means for passing oil through a said filter central opening in response to oil pressure above a first given value.

3. Apparatus as defined in claim 2, wherein said base and cover member planar inner surfaces each contain a central aperture and a radial conduit arranged between said aperture and the associated radial groove, respectively, and further wherein said intermediate member means contains a central opening and a radial conduit arranged between the lower portion of said throughslots and the upper portion of said intermediate member means central opening, thereby to define said first oil bypass means, and further wherein said intermediate member means central opening contains first valve means for opening and closing said first oil bypass means.

4. Apparatus as defined in claim 3, wherein said first valve means comprises a ball bearing and means for biasing said ball bearing toward a normally closed position.

5. Apparatus as defined in claim 4, wherein said base member central aperture contains second pressure responsive valve means for opening said base member central aperature and permitting flow through said base member radial conduit, thereby to define second oil bypass means for bypassing a second of said filter means in response to oil pressure above a second given value.

6. Apparatus as defined in claim 5, and further comprising indicator means actuated in response to opening of said second valve means.

7. Apparatus as defined in claim 1, wherein said cover and base member outer surfaces include coolng fins.

* * * * *